United States Patent [19]

Brafford, Jr.

[11] Patent Number: 5,979,094
[45] Date of Patent: Nov. 9, 1999

[54] PROTECTIVE TRAILER HITCH LIGHTED SIGN

[76] Inventor: Hal Benard Brafford, Jr., 5501 Frenchman's Creek, Durham, N.C. 27713

[21] Appl. No.: 09/081,114

[22] Filed: May 19, 1998

[51] Int. Cl.$^6$ ........................................................ G09F 7/18
[52] U.S. Cl. .................................. 40/590; 40/205; 40/591
[58] Field of Search .............................. 40/590, 591, 205, 40/204, 575, 206

[56] References Cited

U.S. PATENT DOCUMENTS

| | | |
|---|---|---|
| 2,057,249 | 10/1936 | Rioux .................................... 40/204 X |
| 2,180,261 | 11/1939 | Stephenson et al. . |
| 2,494,179 | 1/1950 | King . |
| 2,525,001 | 10/1950 | Sherwood . |
| 2,622,356 | 12/1952 | Valente .................................. 40/575 X |
| 2,836,913 | 6/1958 | Thomson et al. . |
| 3,200,524 | 8/1965 | Hendrickson . |
| 3,521,391 | 7/1970 | Murai . |
| 4,181,320 | 1/1980 | Wellborn, Jr. . |
| 4,738,293 | 4/1988 | Ostrom et al. . |
| 4,852,902 | 8/1989 | Young et al. . |
| 4,955,968 | 9/1990 | Beckerer, Jr. . |
| 5,073,842 | 12/1991 | Monroe .................................... 40/205 |
| 5,407,219 | 4/1995 | Chiu . |
| 5,421,601 | 6/1995 | Hinze et al. . |
| 5,603,179 | 2/1997 | Morrison . |

FOREIGN PATENT DOCUMENTS 2029621  3/1980  United Kingdom .................... 40/591

*Primary Examiner*—Cassandra H. Davis
*Attorney, Agent, or Firm*—Michael E Mauney

[57] ABSTRACT

A trailer hitch accessory with a lighted sign, auxiliary brake lights, and a protective cover for a trailer hitch. A rectangular enclosure equipped with lights is fastened to a trailer hitch by a trailer hitch connection. The trailer hitch connection encloses and protects the trailer hitch from damage from the elements. The rectangular enclosure has lights contained therein, which are connected to the trailer hitch electrical connection by an electrical connector. A removable translucent sign may be placed within the enclosure to be backlit by one or more lights within the enclosure. When the operator of a vehicle activates his headlights, then lights within the enclosure come on lighting the sign for viewing at night. When the operator of the vehicle applies his brakes, it lights not only the brake lights on the vehicle, but also the auxiliary brake light panels on the enclosure.

2 Claims, 4 Drawing Sheets

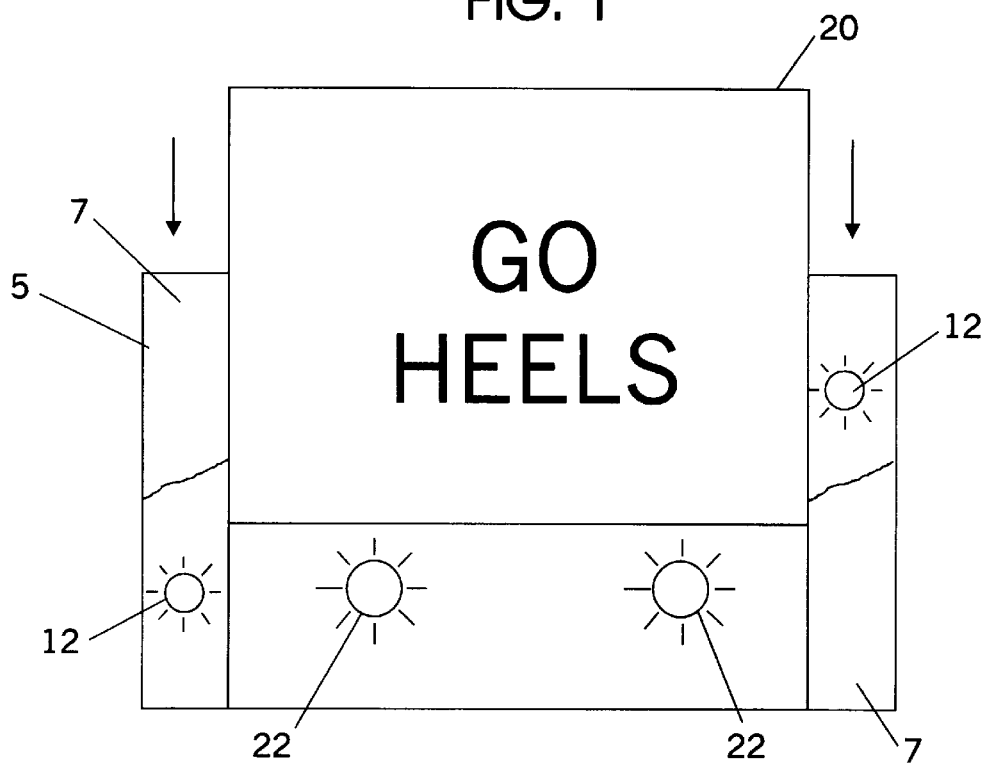
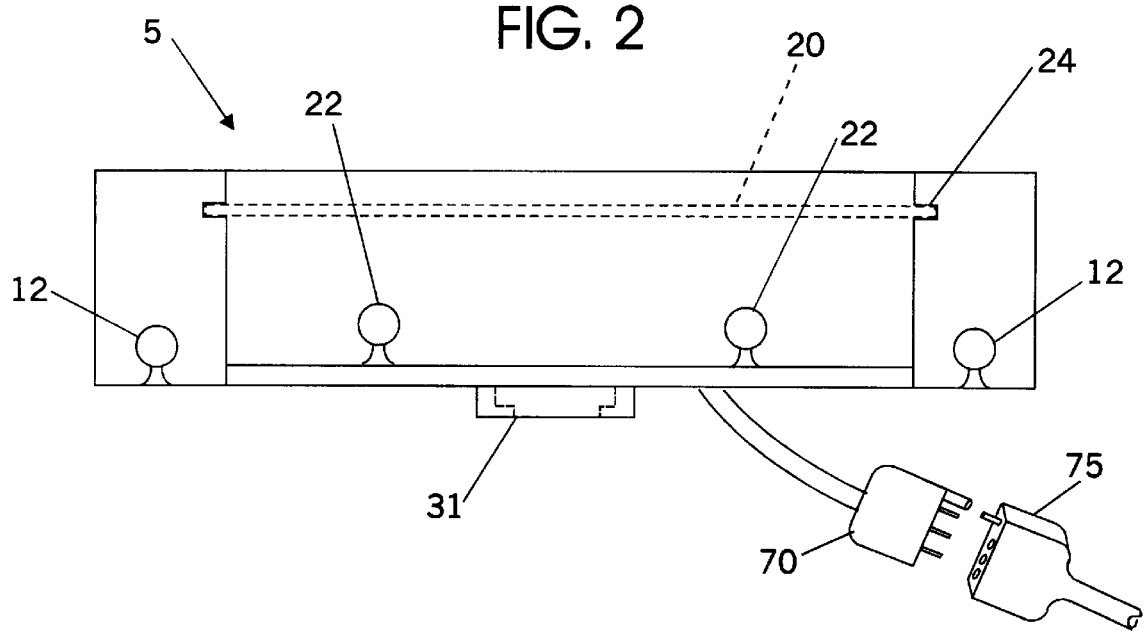

PROTECTIVE TRAILER HITCH LIGHTED SIGN

FIELD OF INVENTION

This invention is a device to fit over and connect to an existing vehicle trailer hitch equipped with an integral wiring connector for operation of lights on a trailer. The invention will provide protection for the vehicle trailer hitch to prevent damage by weather and exposure to the trailer hitch. The invention has a lighted sign. This sign is connected to the integral wiring connector of the vehicle trailer hitch so that the light in the sign is controlled by the vehicle operator. Additionally, the invention is fitted with accessory safety brake lights that come on when the vehicle on which the trailer hitch is installed has its brakes applied.

BACKGROUND OF INVENTION

As is reported in newspapers and automobile magazines, there has been a major shift over the last decade in the automobile buying habits of the American public. The traditional four door family sedan or station wagon has a diminishing market share. Many suburban families have substituted a mini-van or a sport utility vehicle for the family station wagon. Many men now choose to own a pick-up truck rather than a car. Over the last decade, the largest single selling model of a vehicle has been the F-Series Ford truck. The increased sale of these vehicles reflects a change in lifestyle of buyers who are pursuing recreational uses like off-the-road adventures, camping, boat towing, or the other uses to which a sport utility vehicle, van, or truck may be put which are not as appropriate for a family sedan. Many of these vehicles are equipped at the factory with a trailer hitch. These trailer hitches usually come with an integral wiring connector so that lights on the trailer will be operated by the lighting switches and wiring that are integral to the vehicle. Thus, when the operator of the towing vehicle turns on his lights, the integral wiring connection to a towed vehicle cause the trailer lights to come on. Likewise, when the operator of the vehicle turns on his turn signal, the turn signal on the trailer will respond appropriately. Finally, when the operator of the vehicle applies his brakes, brake lights will come on the rear of the trailer. In addition to a trailer hitch that may be installed at the factory, other vehicle owners may have a trailer hitch and wiring connector installed in their vehicle from an after market supplier.

Broadly speaking, trailer hitches come in two types. In one type, the hitch arm is permanently installed and there is a trailer hitch ball bolted to the trailer hitch arm. The hitch ball may be removed when not in use, although many owners will leave the trailer hitch ball attached to the trailer hitch arm permanently. A second type of trailer hitch has a rectangular tubular socket. A removable male connecting piece is inserted into the rectangular tubular socket and secured there by a pin or such similar device. It is on the male connecting piece that the trailer hitch ball is mounted for connection to the trailer hitch connecting cup on the trailer.

These trailer hitches are not the most attractive feature on a vehicle. Moreover, both types of trailer hitches are subject to damage from the elements, road dust and tar, water exposure, and other circumstances encountered by the towing vehicle. Consequently, various types of protective and ornamental covers for trailer hitches have been devised. One type seen for a ball hitch is disclosed in the Ostrom et al., U.S. Pat. No. 4,738,293. There, in one embodiment a decorative duck head is used to cover the trailer hitch ball and to protect it from exposure to damaging elements. A device similar to the Ostrom '293 patent is seen in Becker, Jr., U.S. Pat. No. 4,955,968. Morrison discloses an ornamental cover for the tubular socket trailer hitch in U.S. Pat. No. 5,603,178. Each of these prior United States patents attempts to improve the appearance of the trailer hitch connection found on the towing vehicle, while also providing protection for the trailer hitch connection.

A variety of lighting accessories are also commonly found. Specially lighted license tag receptacles are common. Before the law required the placements of a third brake light above and centered between the two standard brake lights, many people had purchased an accessory brake light for placement on the shelf of the rear window of their vehicle. An early example of a lighting accessory is seen in the Hendricksen, U.S. Pat. No. 3,200,524. There, an accessory light is mounted to the trunk lid of a vehicle with appropriate dedicated accessory wiring. This provides an accessory safety light, but also can convey a particular message. The Hendricksen patent shows in one embodiment a lighted message showing the letters "D.C.", indicating that the owner of the vehicle is a Doctor of Chiropractic medicine. F. W. Sherwood, in U.S. Pat. No. 2,525,001, discloses a decorative light that could be placed on the front or the rear of the vehicle and convey a seasonable message such ask "Merry Christmas". Thomson et al., U.S. Pat. No. 2,836,913 discloses an advertising sign to be mounted on the rear of a vehicle on the trunk lid. It is believed this would find its primary application in commercial vehicles like taxies, company cars, and the like.

SUMMARY OF INVENTION

The present invention utilizes a pre-installed existing trailer hitch and the integral electrical connection to mount and control a lighted sign. The sign will mount on a trailer hitch. It can be readily adopted to mount on either a male ball type trailer hitch or in a tubular socket female type trailer hitch. The sign will ordinarily consist of a rectangular hollow box. Contained within that box will be a plurality of lights. The outwardly facing portion of the box will have a place where a translucent sign may be mounted. The sign may contain a variety of messages according to the wishes of the purchaser of this device. For example, in Green Bay, Wis., the message "Go Pack" might be a popular sign. In Chicago, "Go Bulls" or "Go Cubs" might be a popular sign. Indeed, any of the messages which are commonly seen on bumper stickers could easily be adopted and used as the sign insert to go into the light box of the current invention.

When the operator of the vehicle turns on the vehicle lights, at least one light within the rectangular hollow box will come on. This means the sign will be visible at night or in other adverse lighting conditions where unlighted signs may not be visible. Additionally, at least one light within the light box will be operably engaged by the brake pedal of the vehicle. Hence, when the operator of the vehicle applies the brakes, in addition to the standard brake warning lights found on vehicles, an additional brake light will be produced by the current invention. This provides a marginal, but significant, safety function for the invention.

Because this invention will fit over and connect to the trailer hitch, it will help seal the trailer hitch parts from outside contaminants such as mud, water, dirt, or road tar. The lighting switch for the light box will connect directly to the standard integral trailer wiring connection that come with almost all trailer hitches that are either installed as after market accessories or installed at the factory by the vehicle manufacturer. This means that no wiring changes are necessary on the vehicle. The box may be inexpensively produced and will provide an ornamental feature that allows the owner of the vehicle to express some message reflective of his beliefs or attitudes, much in the way that a bumper sticker does. Additionally, the box provides an auxiliary brake light that will be an added safety feature for the operator of the vehicle.

The current invention will be easily mounted and removed from the trailer hitch. When the trailer hitch is not used to tow a trailer, then the current invention may be installed and used. It is easy to remove it from the trailer hitch once it is desired to actually mount a trailer to the hitch for towing.

These and other additional objects and advantages of the present invention will become apparent after a review of the drawings and the Detailed Description found below.

BRIEF DESCRIPTION OF THE DRAWINGS

FIG. 1 shows the current invention as it would appear to an outside viewer with a portion shown in a cut-a-way.

FIG. 2 shows the current invention frame above and in cut-a-way.

DETAILED DESCRIPTION OF THE DRAWINGS

Figure 4A:
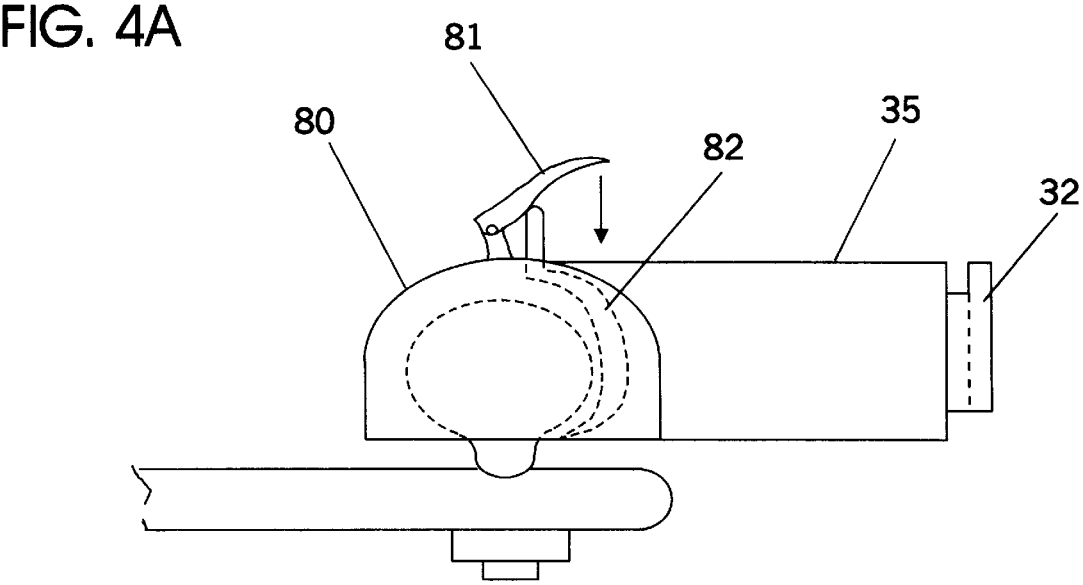
FIGS. 4A, 4B, and 4C show ways of mounting the current invention to both ball type and female tubular trailer hitches.

The trailer hitch accessory (1) may be constructed of two parts, a trailer hitch accessory sign (5) (seen in FIG. 1) and a connecting piece (35) (seen in FIGS. 4A, B, and C). FIG. 1 shows the trailer hitch accessory sign (5) as seen from the rear by a viewer who is at approximately the level of the bumper hitch to which the trailer hitch accessory (1) is attached. A translucent message panel (20) slides into the trailer hitch accessory sign (5) on slots (24) (shown in FIG. 2). Any desirable message may be placed on the translucent sign (20). Here, the message is "Go Heels". This message would have appeal to University of North Carolina at Chapel Hill sports fans. One owner may have a number of signs to be used on different occasions. Flanking the translucent message panel (20) are brake light panels (7). These are shown in partial cut-a-way. These brake light panels (7) would ordinarily consist of red translucent plastic. Shown in the cut-a-way portion in FIG. 1 on each of the brake light panels (7) are brake light bulbs (12). In the embodiment shown, there would be a total of four brake light bulbs (12), two for each brake light panel (7). These would be unlit until the operator of the vehicle on which the trailer hitch accessory is installed applies his brakes. This would send an electrical current through the integral electrical connector (75) (seen in FIG. 2) to the trailer hitch accessory brake light panel (7) with brake light bulbs (12). This would cause the brake light bulbs (12) to light, causing the translucent brake light panel (7) to glow red and thus provide an auxiliary brake light for greater safety for the operator of the vehicle on which the trailer hitch accessory sign (5) is installed. In a like manner, turns could also be signaled.

The translucent message panel (20) is approximately halfway installed on the slots (24). In the portion of the trailer hitch accessory sign (5) that is seen below the translucent message panel (20), two sign light bulbs (22) are seen. Both the brake light bulbs (12) and the sign light bulbs (22) will ordinarily be the standard type of tail light bulb that can be found in any auto parts supply store. This simplifies replacement of these bulbs in the event that one or more of them burn out and simplifies the wiring and current requirements placed on the integral electrical connector (75). Two more sign light bulbs (22) would ordinarily mounted above the two sign light bulbs that are seen making a total of four sign light bulbs (22). When the operator of the vehicle turns on the vehicle's headlights, an electrical current is sent through the integral electrical connector (75) to power the four sign light bulbs (22) This will light up the translucent message panel (20) to make it visible at night.

The trailer hitch accessory sign (5) can be made in any desired shape. However, most signs are approximately rectangular in shape that make it easier to present printed messages. Therefore, the preferred embodiment will be approximately rectangular in shape and somewhat larger than a standard license plate. A standard license plate is 6 inches high and 12 inches wide. The trailer hitch accessory sign (5) can be made of any rigid durable material, but it is believed a variety of plastics, including polyethylene and polypropylene, will best serve the needs of the trailer hitch accessory. These materials are light, durable, and corrosion resistant.

Figure 3:
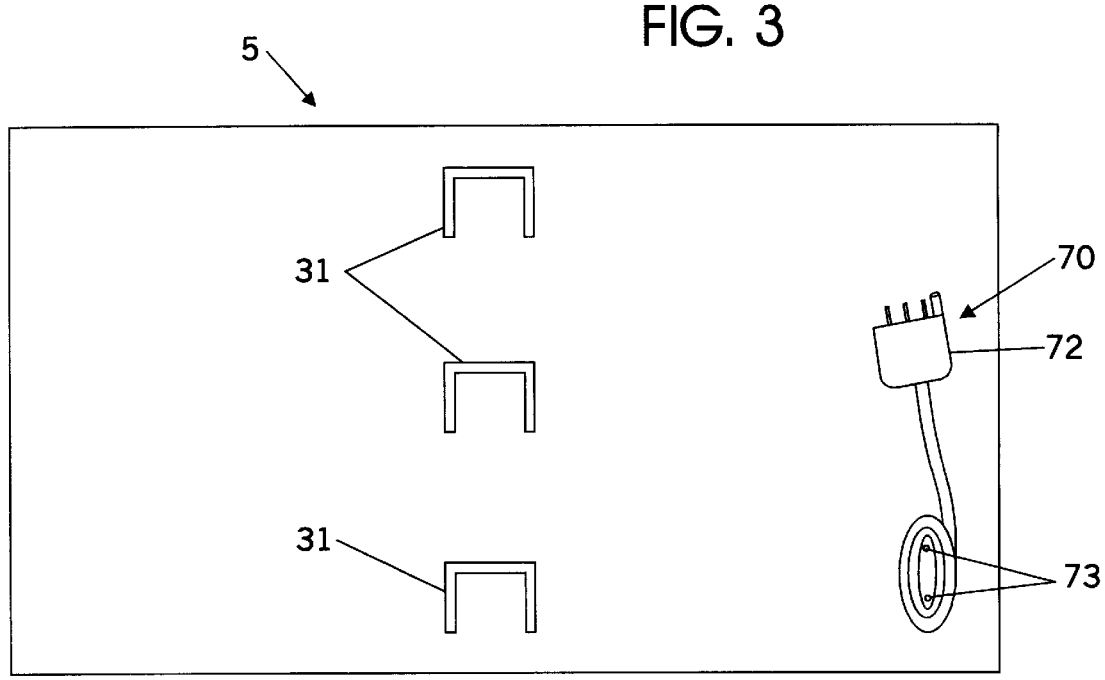
FIG. 3 shows the current invention seen from behind.

FIG. 2 shows the trailer hitch accessory sign (5) seen from above and in partial cut-a-way. Seen for the first time are the slots (24) on which the translucent message panel (20) (shown in dotted lines) would be slid for installation. The translucent message panel (20) would rest on the floor of the trailer hitch accessory (5). The brake light panels (7) are outside and flank the ends of the translucent message panel (20). The trailer hitch accessory sign (5) will have an electrical connection (70). Ordinarily there are three male prongs and one female receptacle for connection with the integral electrical connector (75) that is installed on the towing vehicle. A U-shaped mounting slot (31) is shown on the back of the trailer hitch accessory sign (5) and centered. Usually there will be multiple U-shaped mounting slots (31) (as shown in FIG. 3) for adjustable mounting. The brake light panel (7) is lit from the inside by the brake light bulbs (12) and the translucent message panel (20) is lit by the sign light bulbs (22).

Figure 3A:
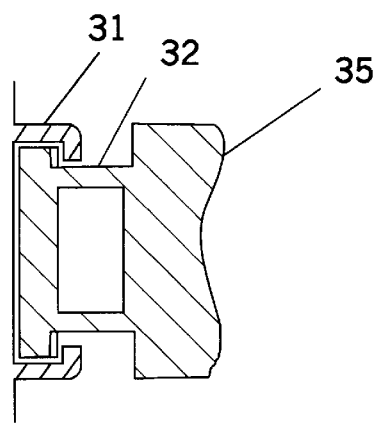
FIG. 3A shows in more detail mechanical connections and FIG. 3b shows in more detail electrical connections.
Figure 3B:
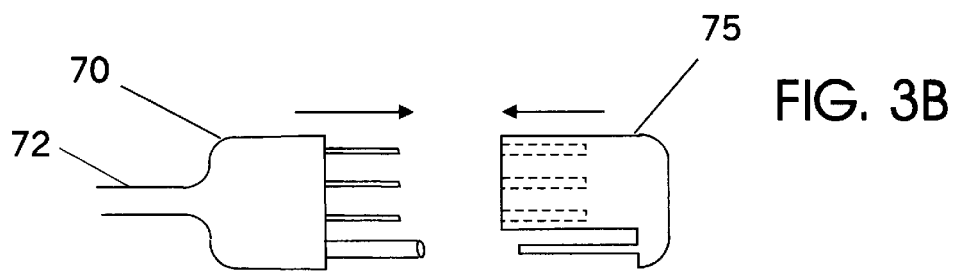

FIG. 3 shows the trailer hitch accessory sign (5) seen from the rear. FIG. 3A highlights the and mechanical connections of the device. Centered in the trailer hitch accessory (5) are three U-shaped mounting slots (31). These mounting slots will have an open portion at the bottom and be open in a portion of the back but closed along the top edge. An overhanging lip along the sides and top provides for an easy mounting by sliding a male mounting piece (32) (seen in FIG. 3A) into the slot from the bottom until it rests against the top part of the U-shaped mounting piece (31). This is seen from above in FIG. 3A and in cut-a-way. That male mounting slot (32) is part of the trailer hitch connecting piece (35) (not shown completely in FIG. 3A, but may be seen in FIG. 4). In FIG. 3 at one corner of the device is a connecting cord (72) terminating in a combination male and female electrical connector (70) having four connecting points. Ordinarily, the electrical connector (70) will have a connecting cord (72) of more than one foot in length. There will be two posts (73) around which any slack in the connecting cord (72) may be wrapped and tied off. FIG. 3AB shows the electrical connector (70) about to be connected to the integral wiring connector (75), which will be found on cars equipped with a trailer hitch. This, ordinarily, is a four-piece connector having three female connections and one male connection. This mates with the electrical connector (70), which has three male and one female connectors. These four connections provide not only means for powering the lights in the trailer hitch accessory sign (5), but also controlling their function.

Any reasonable means of connecting the trailer hitch accessory sign (5) to the trailer hitch of a vehicle could be used. The entire trailer hitch accessory (1) has two parts, a trailer hitch accessory sign (5) and a connecting piece (35). The reason the trailer hitch accessory will usually consist of two parts is to allow the connecting piece (35) to remain in place without necessarily having the trailer hitch accessory sign (5) mounted to it. First, this gives the owner of the invention the option of using different connecting pieces on different types of trailer hitches, but only requires him to have one trailer hitch accessory sign (5). Hence, he can simply move the trailer hitch accessory sign (5) from one vehicle to another, depending on his desires. It also may be an advantage to leave the connecting piece (35) in place when driving off the road in very rough terrain so that it may serve the protective function for the trailer hitch. However, in rough terrain it may be desirable to remove the trailer hitch accessory sign (5) to avoid damage to it in the event the driver goes through deep mud, drives over heavy brush, or encounters other environments that could damage the trailer hitch accessory sign (5). However, it is certainly possible and, in some circumstances may be desirable, to make the trailer hitch accessory sign (5) and the connecting piece (35) as one integral unit. Under these circumstances, it is a simple matter to make the connection between the trailer hitch accessory sign (5) and the connecting piece (35) permanent or to construct the trailer hitch accessory as one piece. The use of a connecting piece (35) to connect directly to either the trailer hitch ball or the tubular female receptacle on the pre-existing vehicle trailer hitch means that the trailer hitch accessory sign (5) can be moved from one vehicle with one type of trailer hitch to another vehicle with a different type of trailer hitch simply by changing the connecting piece (35). The connecting piece (35) will necessarily depend on what type of trailer hitch is found on the vehicle to which the trailer hitch accessory (1) is to be used. However, the trailer hitch accessory sign (5) can be standardized if the trailer hitch accessory (1) has two parts, the trailer hitch accessory sign (5) and the connecting piece (35). Necessarily the trailer hitch accessory sign (5) must be connected to the connecting piece (35) in some fashion. Any reasonable means of mechanical connections may be used. This could include bolts, or a clip arrangement, even an industrial variety of the loop and pile material known by the trade name "Velcro™". However, in FIG. 3 the back of the trailer hitch accessory sign (5) shows a U-shaped mounting slot (31). Three U-shaped mounting slots (31) are shown at varying heights on the trailer hitch accessory sign (5). This will enable the user to vary the position of the sign relative to the height of the trailer hitch. It is important that the trailer hitch accessory sign (5) be high enough to provide appropriate ground clearance, but not be so high as to block the license plate so the plate would no longer be visible. Many states have laws that prevent mounting of signs or other materials that block the view of the license plate. Therefore, it is important that the trailer hitch accessory be mounted in such a fashion that it be readily visible, but not obscure the onlookers line of sight to the license plate. By giving three mounting positions, it is believed this will accomplish this goal for almost all trailer hitches.

Figure 4B:
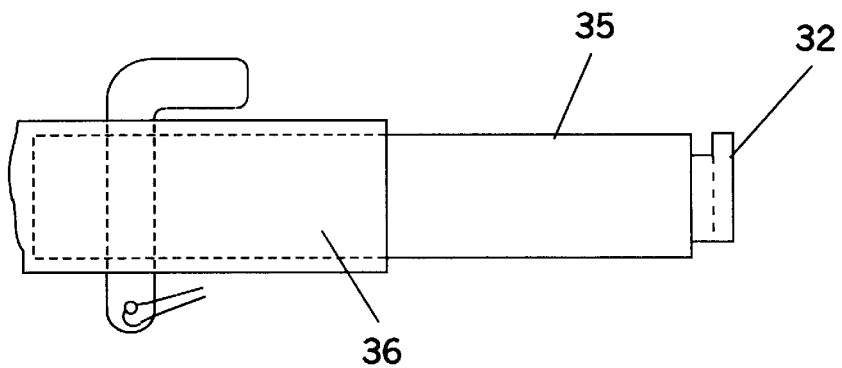
Figure 4C:
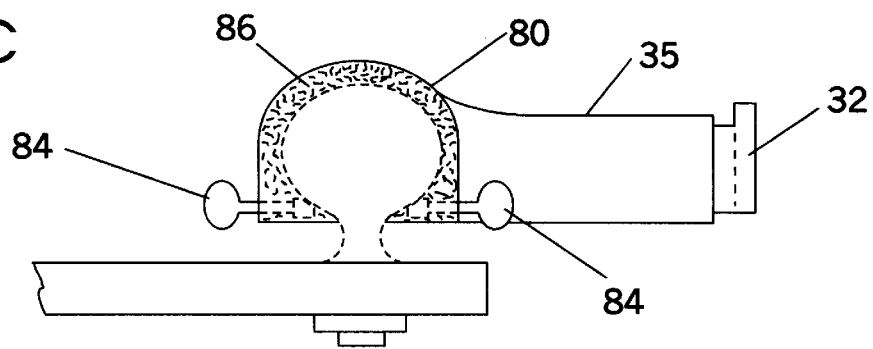

The trailer hitch accessory sign (5) will be mounted to the two main types of trailer hitches as shown in FIG. 4A, 4B, and 4C. In FIG. 4A, a trailer hitch with a ball installed and bolted into place, there will ordinarily be a cup receptacle (80) on the mounting piece (35) for the hitch ball. A pivoting lever (81) is connected to a crescent shaped securing piece (82). When the lever (81) is in the raised position as is shown in FIG. 4A, it pulls the crescent piece (82) up and away from the trailer hitch ball. When the lever (81) is pushed downward as is shown by the arrow, it pushes the crescent piece (82) against the ball and secures the trailer hitch ball within the cup receptacle (80). To connect the trailer hitch accessory sign (5) to the connecting piece (35), the male mounting piece (32) slides into the U-shaped mounting slot (31) on the back of the trailer hitch accessory sign (5). FIG. 4B shows how the connecting piece (35) connects to the tubular female type trailer hitch. The connecting piece (35) simply consists of an appropriately sized rigid tube to fit within the tubular receptacle on the trailer hitch mount on the vehicle. Ordinarily, the male arm (36) is secured into place by a pin that slides through a hole on the tubular trailer hitch, through a hole in the male arm (36), through the other side of the trailer hitch in a corresponding hole. Ordinarily, a spring pin is used to secure the mounting pin into place. The male mounting piece (32) is shown attached at one end of the male arm (36). Once either of the trailer hitch connecting pieces (35) is secured to the trailer hitch, the trailer hitch accessory sign (5) may be mounted thereto by use of the U-shaped mounting slot (31) on the trailer hitch accessory sign (5) and the male mounting piece (32) on the connecting piece (35). The electrical connections will be made and the device will be ready for use. Shown in FIG. 4C is an alternative way of mounting the trailer hitch accessory sign (5) using a cup receptacle (80). On most standard trailer hitches, the cup receptacle (80) which is used on the trailer arm is substantially larger than is the mounting post ball secured to the trailer hitch on the towing vehicle. This is because there is considerable tongue weight on the trailer arm that connects the trailer to the trailer hitch. Thus there must be "play" or leeway in the cup receptacle (80) because it is difficult to precisely position the ball exactly under the cup receptacle piece (80). The weight on the trailer arm makes it difficult to maneuver the trailer arm. Therefore, there must be provision for an inexact fit, hence the leeway provided in the size of the cup receptacle (80). However, for this device, the connecting piece (35) will be made of a light weight plastic material, hence the cup receptacle (80) of the connecting piece (35) may be made to much closer tolerances. As shown in FIG. 4C, the cup receptacle (80) much closer in size to the ball on the trailer hitch. It is lined with a foam material (86). This provides for a secure, noiseless, frictional fit. It is secured in place by thumbscrews (84) which are screwed out when it is desired to remove the piece and screwed in for a tight fit against the ball when it is desired to secure the connecting piece (35) in place. It will be readily appreciated that any of the connecting pieces (35) shown in FIG. 4A, 4B, or 4C not only provides a way of mounting the trailer hitch accessory sign (5) to a trailer hitch, but also provides a covering and protective function for that trailer hitch. In the cup receptacle (80) variation of the connecting piece (35), the cup receptacle (80) fits over the ball keeping weather, grit, grime and other materials from impinging on the trailer hitch ball. Likewise, the male arm (36) variation of the connecting piece (35) slides within the tubular female receptacle in the vehicle trailer hitch keeping water, grit, grime and other contaminants from getting into the tubular receptacle. Thus the connecting piece (35) can serve an important protective function for the trailer hitch even if the trailer hitch accessory sign (5) is not in use.

Figure 5:
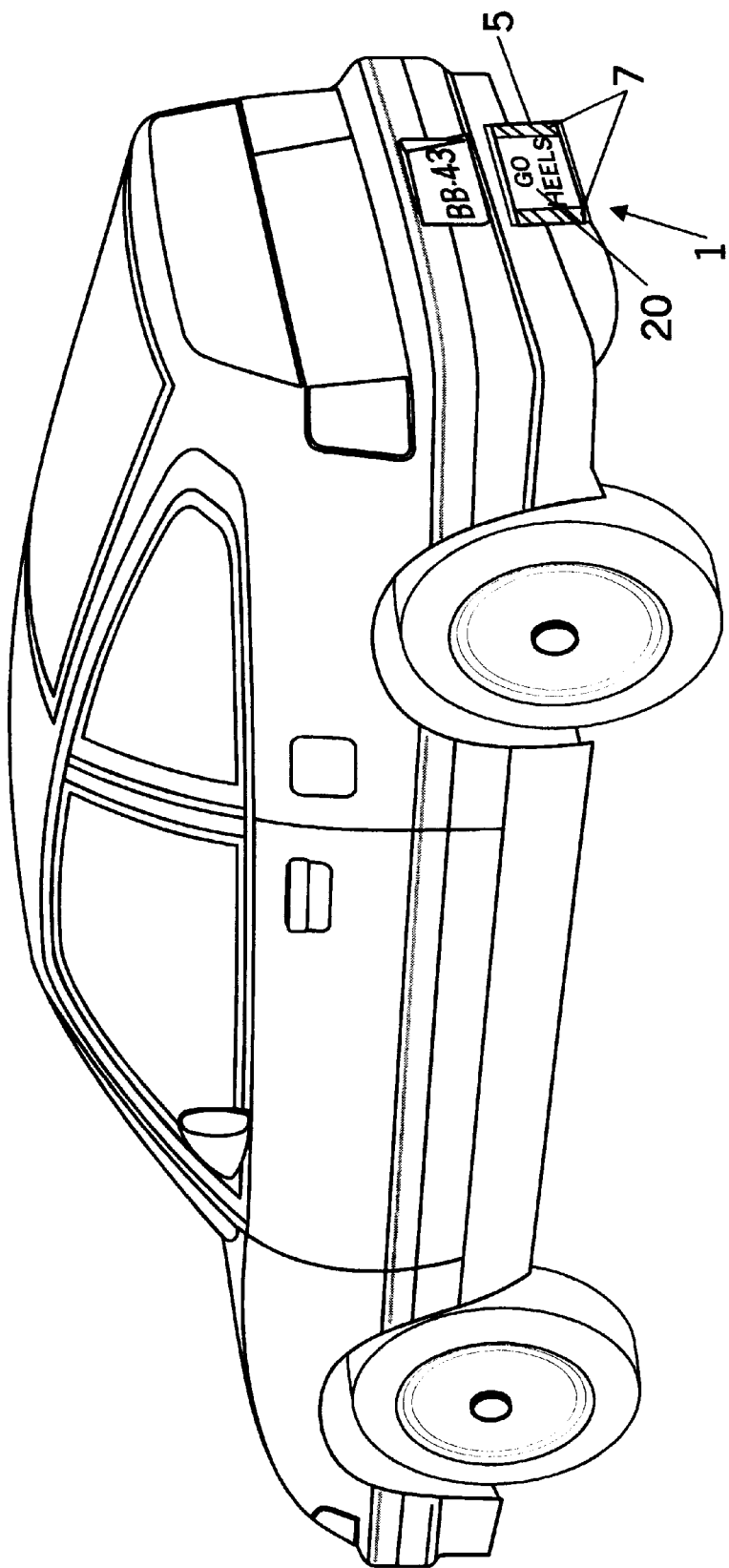
FIG. 5 shows the current invention mounted to a trailer hitch at the rear bumper of a car.

As will readily be appreciated from FIG. 5, this invention serves a triple purpose of providing a protective cover for the trailer hitch on the vehicle, providing an extra brake light, and serving as a personal statement by the owner of the vehicle depending on the choice of the translucent message panel (20). FIG. 5 shows the trailer hitch accessory (1) mounted on the back of a vehicle. The mounting means are not shown. In most vehicles the license tag is centered somewhere near the rear bumper of the vehicle. Below the rear bumper is the trailer hitch. Here, the trailer hitch accessory sign (5) is shown with the translucent message panel (20) bearing the slogan "Go Heels". On each side of the translucent message panel (20) are the brake light panels (7). It will be readily appreciated, that when the brake lights of the vehicle are applied, these two brake light panels (7) will add to the overall noticeability of the brake lights and provide added safety for the operator. By the same token, the left or right turn signal could activate the left or right brake light panel (7) on the trailer hitch accessory sign (5). It is believed in most applications it will not be necessary nor desirable to use a turn signal on the trailer hitch accessory sign (5). Because the trailer hitch accessory sign (5) will ordinarily be mounted near the center of the vehicle, the light indicating a turn signal would necessarily blink near the center of the vehicle. This could be confusing since it is customary to make the turn signals blink, respectively, at the right or left side of the vehicle depending on the anticipated turn. This is not a problem when the brake lights are applied since brake lights on both the left and right sides of the vehicle come on when the brakes are applied. Having an extra center brake light will merely emphasize the point to the following vehicle that the brakes are being applied. When the operator of the vehicle turns on the headlights, then the sign light bulbs (22) are activated lighting up the translucent message panel (20) shown here with the slogan "Go Heels".

I claim:

1. An ornamental protective lighted sign to attach to a trailer hitch and hitch electrical connection comprising:

(A) a light and sign enclosure with:
      (i) a translucent sign;
      (ii) at least one light within said light and sign enclosure whereby said light illuminates said translucent sign for viewing in the dark;
      (iii) means for electrically connecting said light and sign enclosure to a hitch electrical connection for electrically powering said light; and
      (iv) supplemental brake light panels activated when the operator of a vehicle applies brakes by said means for electrically connecting said light and sign enclosure;
   (B) a hitch connection piece with:
      (i) means for attaching said light and sign enclosure to said hitch connection piece is constructed so that said light and sign enclosure may be readily attached and detached at different points to said hitch connection piece whereby said light and sign enclosure may be adjusted to avoid obscuring an onlooker's view of a license plate;
      (ii) means for protecting exposed portions of said trailer hitch;
      (iii) means for removably attaching said hitch connection piece to said trailer hitch.

2. An ornamental protective lighted sign of claim 1 wherein said means for removably attaching said light and sign enclosure to said hitch connection piece consists of plurality of a U-shape female slot on said light and sign enclosure for mating male connection on said hitch connection piece.

* * * * *